United States Patent
Nathan et al.

(10) Patent No.: US 8,209,662 B2
(45) Date of Patent: Jun. 26, 2012

(54) APPLICATION RETARGETING

(75) Inventors: Adam D. Nathan, Kirkland, WA (US);
John I. Montgomery, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1207 days.

(21) Appl. No.: 11/633,400

(22) Filed: Dec. 4, 2006

(65) Prior Publication Data
US 2008/0134144 A1 Jun. 5, 2008

(51) Int. Cl.
*G06F 9/44* (2006.01)
(52) U.S. Cl. ......... 717/110; 717/123; 717/141; 717/143
(58) Field of Classification Search .......... 717/110–113, 717/120–123, 136–143
See application file for complete search history.

(56) References Cited

U.S. PATENT DOCUMENTS

| | | | |
|---|---|---|---|
| 5,918,035 | A | 6/1999 | Van Praet et al. |
| 5,933,642 | A | 8/1999 | Greenbaum et al. |
| 6,292,938 | B1 | 9/2001 | Sarkar et al. |
| 6,343,373 | B1 | 1/2002 | Koizumi et al. |
| 6,629,312 | B1 | 9/2003 | Gupta |
| 6,727,927 | B1 * | 4/2004 | Dempski et al. ............ 715/853 |
| 6,772,106 | B1 | 8/2004 | Mahlke et al. |
| 6,948,158 | B2 | 9/2005 | Van Gageldonk et al. |
| 6,990,619 | B1 | 1/2006 | Kapur et al. |
| 7,047,518 | B2 * | 5/2006 | Little et al. ................... 717/108 |
| 2002/0120917 | A1 * | 8/2002 | Abrari et al. ................. 717/110 |
| 2003/0188034 | A1 * | 10/2003 | Goldberg et al. ............ 709/310 |
| 2004/0187090 | A1 * | 9/2004 | Meacham ..................... 717/103 |
| 2004/0268309 | A1 * | 12/2004 | Grover et al. ................ 717/120 |
| 2005/0289485 | A1 | 12/2005 | Willis |

FOREIGN PATENT DOCUMENTS

EP 0801346 B1 10/1997
WO WO2005119439 A3 12/2005

OTHER PUBLICATIONS

Greenfield et al., Software factories: assembling applications with patterns, models, frameworks and tools, ACM, 2003, pp. 16-27.*
Gauthier et al., Automatic generation and targeting of application specific operating systems and embedded systems software, IEEE, 2001, pp. 679-685.*
Davidson, et al., "The Design and Application of a Retargetable Peephole Optimizer", Date: 1980, pp. 191-202, vol. 2 , Issue 2, http://portal.acm.org/citation.cfm?doid=357094,357098.
Nowak, et al., "Verification of hardware descriptions by retargetable code generation", Date: 1989, pp. 441-447, http://portal.acm.org/citation.cfm?id=74456&dl=ACM&coll=portal&CFID=11111111&CFTOKEN=2222222.
Rajagopalan, et al., "A retargetable VLIW compiler framework for DSPs with instruction-level parallelism", Date: Nov. 2001, On pp. 1319-1328, vol. 20, Issue: 11 http://ieeexplore ieee org/xpl/freeabs all jsp?.

* cited by examiner

*Primary Examiner* — Anna Deng
*Assistant Examiner* — Satish Rampuria

(57) ABSTRACT

Various technologies and techniques are disclosed for retargeting applications to different types. A development environment is provided for writing software. Input is received from a user to write application logic for a project. The user selects an option to save the project as a particular type of project. The application logic is wrapped with metadata appropriate for the particular type of project and at least one resulting file is created. The system determines if the resulting file needs compiled, and if so, compiles the resulting file into a compiled application. A second selection can be received from the user to save the project as a second type. In such a case, the application logic is wrapped with metadata appropriate for the second type of project and at least one resulting file is created.

18 Claims, 7 Drawing Sheets

APPLICATION RETARGETING

BACKGROUND

Typically when a developer wants to create a software application, the first thing they do is tell their tool what type of application they want to create—a MICROSOFT® WINDOWS® application, a web application, an operating system service and so on. They typically start by selecting File/Create New Project or some similar series of events, specify the type of project they want to create, and then write the code for that project type. This process is called "targeting" the application to a specific platform. If the user later wants to take that same application and turn it from, say, a WINDOWS® application into a gadget, they need to tell the tool to create a new project of the gadget type and copy their code into the new project and make any modifications to the code there.

SUMMARY

Various technologies and techniques are disclosed for retargeting applications to different types. A development environment is provided for writing software. Input is received from a user to write application logic for a project. The user selects an option to save and/or generate the project as a particular type of project. The application logic is wrapped with metadata appropriate for the particular type of project and at least one resulting file is created with an appropriate extension. The system determines if the resulting file needs compiled, and if so, compiles the resulting file into a compiled application.

In one implementation, the project can be retargeted to a different type after the first type of project is created as described above. A second selection is received from the user to generate the project as a second type. In such a case, the application logic is wrapped with metadata appropriate for the second type of project and at least one resulting file is created.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
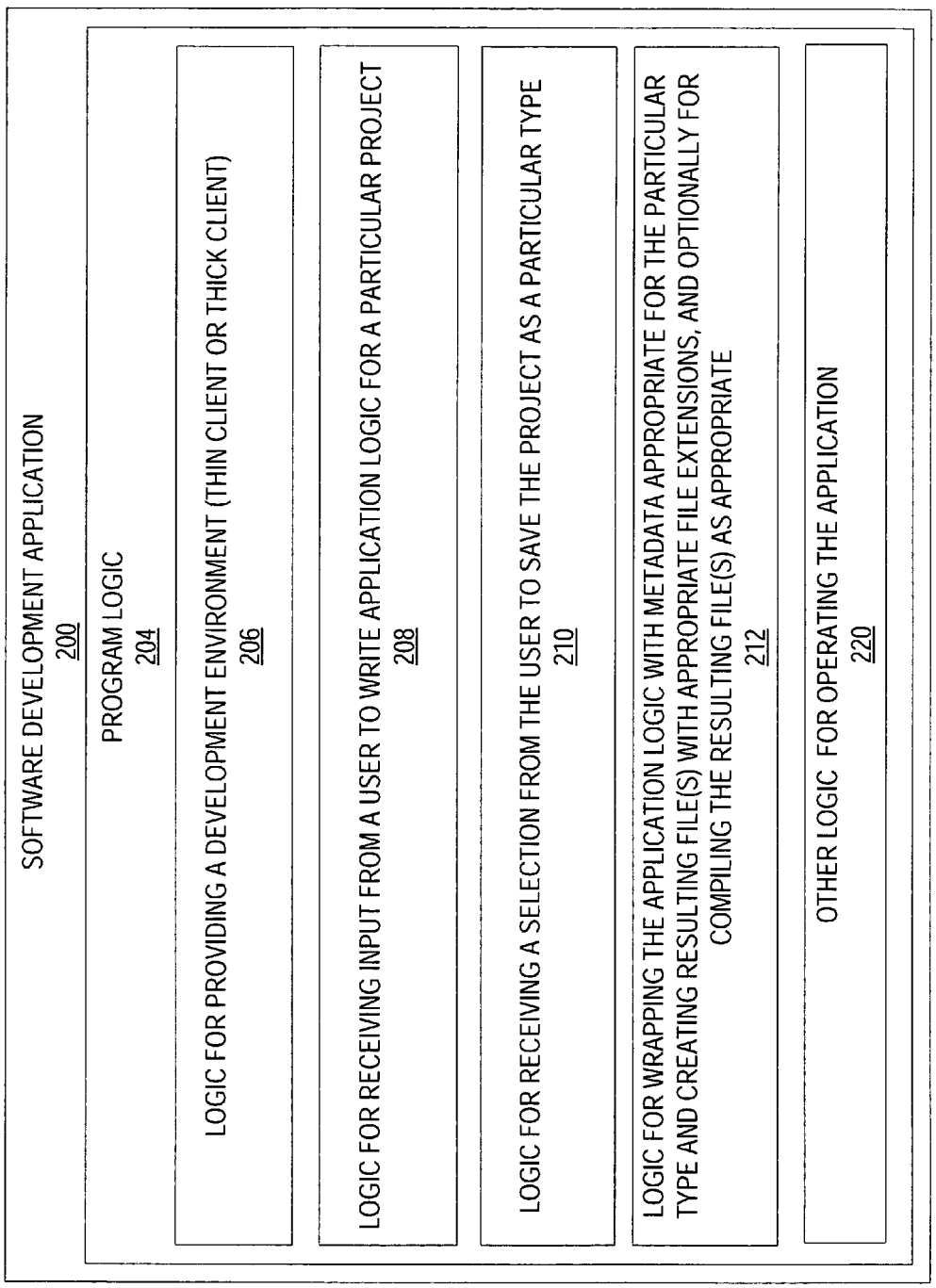
FIG. 1 is a diagrammatic view of software development application of one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as a software development application, but the system also serves other purposes in addition to these. In one implementation, one or more of the techniques described herein can be implemented as features within a software development program such as MICROSOFT® VISUAL STUDIO®, Eclipse, Macromedia Dreamweaver, or from any other type of program or service that allows a user to create software for one or more operating system platforms.

In one implementation, a software development application is provided that allows the developer to specify the target when they save the application rather when they create the application, making it much simpler for a developer to create an application. In another implementation, the software development application allows the developer to save the application to different targets quickly, enabling them to use the same code to create multiple types of applications (a web app/client app/gadget/etc.) after the code is written. This gives the developer substantially more freedom to retarget an application easily, for example converting a MICROSOFT® WINDOWS® application into a gadget or a web client application.

Turning now to FIG. 1, software development application 200 operating on computing device 700 (of FIG. 7) is illustrated. In one implementation, software development application 200 is one of the application programs that reside on computing device 700 (of FIG. 7). However, it will be understood that software development application 200 can alternatively or additionally be embodied as computer-executable instructions on one or more computers and/or in different variations than shown on FIG. 7. Alternatively or additionally, one or more parts of software development application 200 can be part of system memory 704 (on FIG. 7), on other computers and/or applications 715 (on FIG. 7), or other such variations as would occur to one in the computer software art.

Software development application 200 includes program logic 204, which is responsible for carrying out some or all of the techniques described herein. Program logic 204 includes logic for providing a development environment (thin client or thick client) 206; logic for receiving input from a user to write application logic for a particular project 208; logic for receiving a selection from the user to save the project as a particular type 210; logic for wrapping the application logic with metadata appropriate for the particular type and creating resulting file(s) with appropriate file extensions, and optionally for compiling the resulting file(s) as appropriate 212; and other logic for operating the application 220. In one implementation, program logic 204 is operable to be called programmatically from another program, such as using a single call to a procedure in program logic 204.

Figure 2:
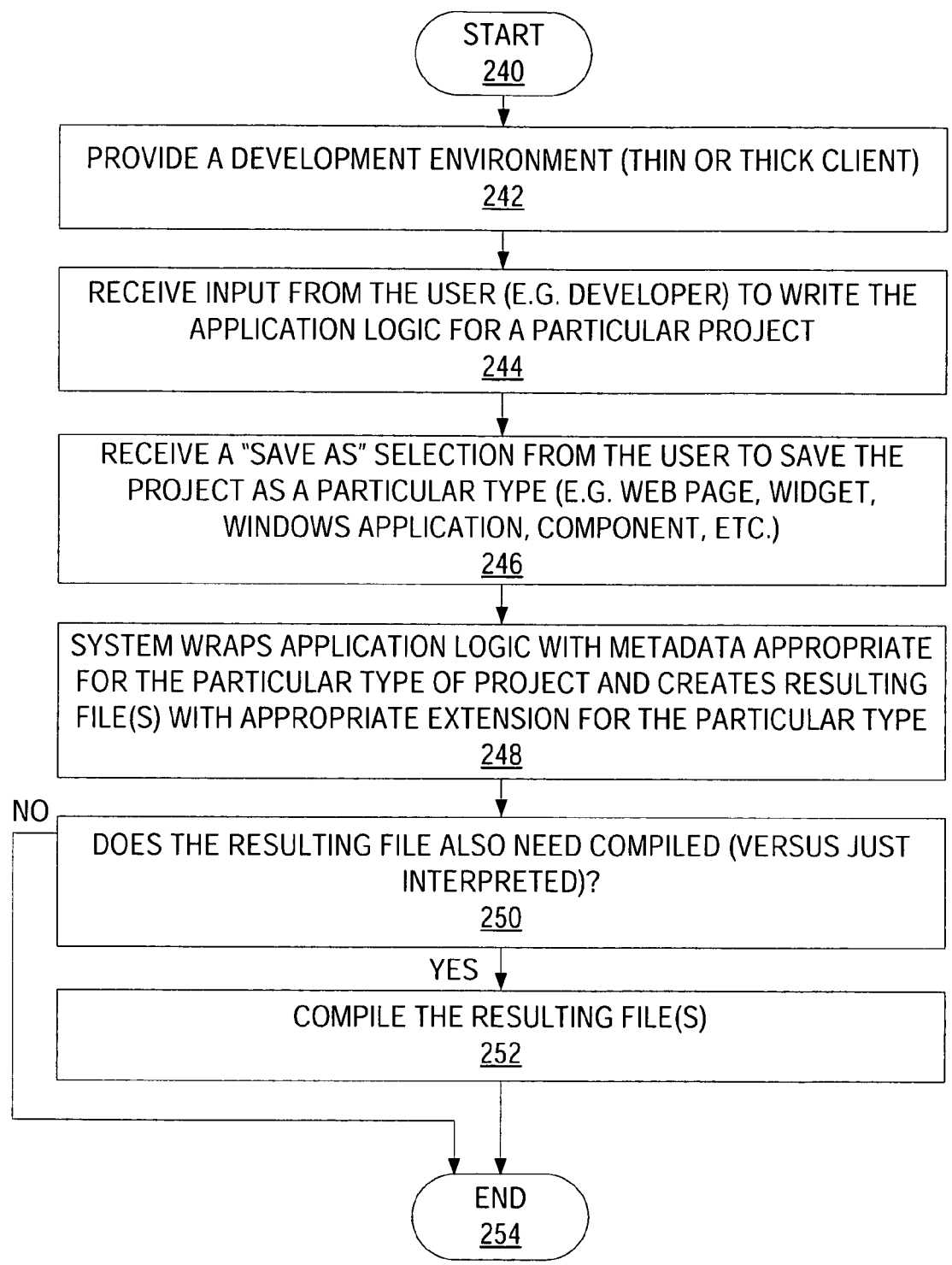
FIG. 2 is a high-level process flow diagram for one implementation of the system of FIG. 1.
Figure 3:
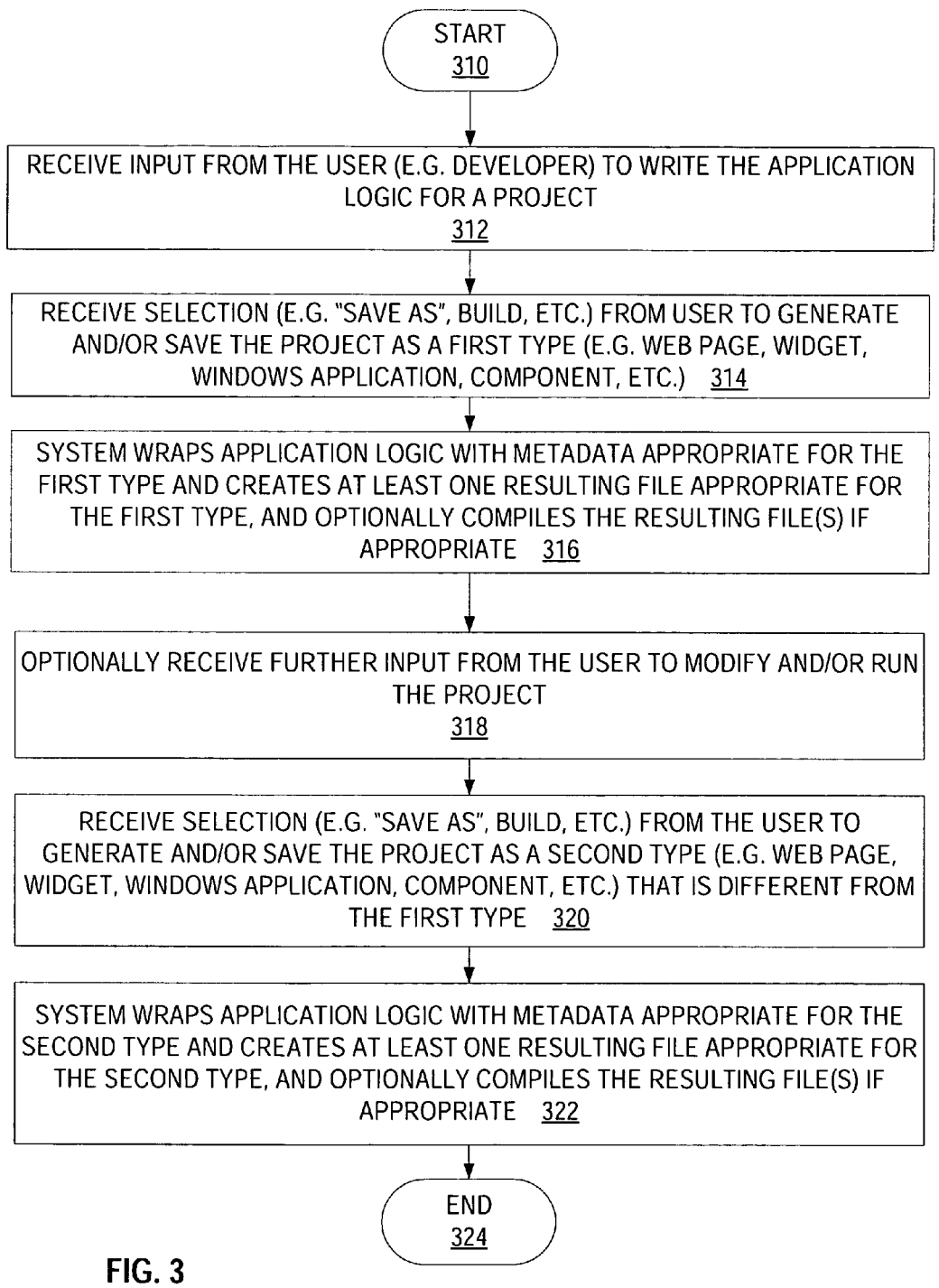
FIG. 3 is a process flow diagram for one implementation of the system of FIG. 1 illustrating the stages involved in creating the project as one type and then retargeting the project to a second type.
Figure 4:
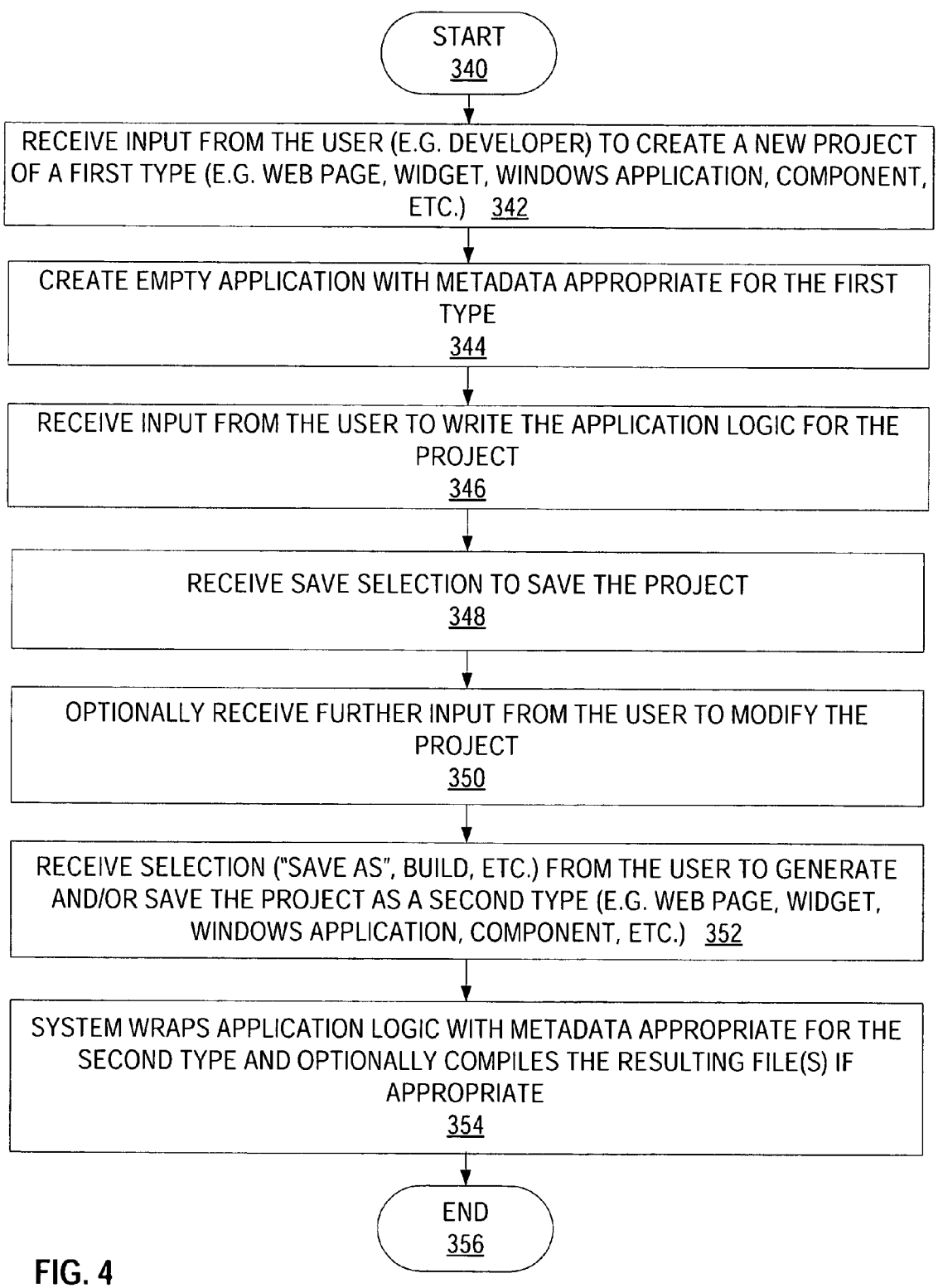
FIG. 4 is a process flow diagram for one implementation of the system of FIG. 1 illustrating the stages involved in selecting the first project type before starting any development and then retargeting the project to a second type.

Turning now to FIGS. 2-4 with continued reference to FIG. 1, the stages for implementing one or more implementations of software development application 200 are described in further detail. FIG. 3 is a high level process flow diagram for software development application 200. In one form, the process of FIG. 3 is at least partially implemented in the operating logic of computing device 700 (of FIG. 7). The procedure begins at start point 240 with providing a development environment (thin or thick client) (stage 242). Input is received from the user (e.g. developer) to write the application logic for a particular project (stage 244).

After the user is finished writing some or all the application logic, the system receives a "Save As" selection from the user to save the project as a particular type (stage 246). A few non-limiting examples of the type of project that can be created include a web page, a widget, a MICROSOFT® WINDOWS® application, a component, etc. In one implementation, the user has not yet chosen the intended file type until after writing some of the application logic. In another implementation, as described in further detail in FIG. 4, the user can choose a file type up front before writing any application logic and then change it later. The system wraps the application logic with metadata appropriate for the particular type of project and creates resulting file(s) with the appropriate extension for the particular type (stage 248). As one non-limiting example, if the type of project is a web page, then the code the developer typed may be wrapped with some HTML code and saved with an HTML extension so it can be viewed in a web browser. If the resulting file also need compiled (versus just interpreted) (decision point 250), then the system also compiles the resulting file(s) as appropriate (stage 252). The process ends at end point 254.

FIG. 3 illustrates one implementation of the stages involved in creating the project as one type and then retargeting the project to a second type. In one form, the process of FIG. 4 is at least partially implemented in the operating logic of computing device 700 (of FIG. 7). The procedure begins at start point 310 with receiving input from the user (e.g. developer) to write the application logic for a project (stage 312). The system receives a selection (e.g. "Save As", "Build", etc.) from the user to generate and/or save the project as a first type (e.g. web page, widget, WINDOWS® application, component, etc.) (stage 314). The system wraps the application logic with metadata that is appropriate for the first type and creates at least one resulting file appropriate for the first type (stage 316). The system optionally compiles the resulting file(s) if appropriate (stage 316). Further input can be received from the user to modify and/or run the project if desired (stage 318). The system receives another selection (e.g. "Save As", "Build", etc.) from the user to generate and/or save the project as a second type (e.g. web page, widget, WINDOWS® application, component, etc.) that is different from the first type (stage 320). The system wraps the application logic with metadata appropriate for the second type and creates at least one resulting file appropriate for the second type (stage 322). The system optionally compiles the resulting file(s) if appropriate (stage 322). The process ends at end point 324.

FIG. 4 illustrates one implementation of the stages involved in selecting the first project type before starting any development and then retargeting the project to a second type at a later time. In one form, the process of FIG. 4 is at least partially implemented in the operating logic of computing device 700 (of FIG. 7). The procedure begins at start point 340 with receiving input from the user (e.g. developer) to create a new project of a first type (e.g. web page, widget, WINDOWS® application, component, etc.) (stage 342). The system creates an empty application with metadata appropriate for the first type (stage 344). Input is received from the user to write the application logic for the project (stage 346). A Save selection is received to save the project (stage 348). Further input can be received from the user to modify the project if desired (stage 350). The system receives a selection (e.g. "Save As", "Build", etc.) from the user to generate and/or save the project as a second type (e.g. web page, widget, WINDOWS® application, component, etc.) (stage 352). The system wraps the application logic with metadata appropriate for the second type and optionally compiles the resulting file(s) as appropriate (stage 354). The process ends at end point 356.

Figure 5:
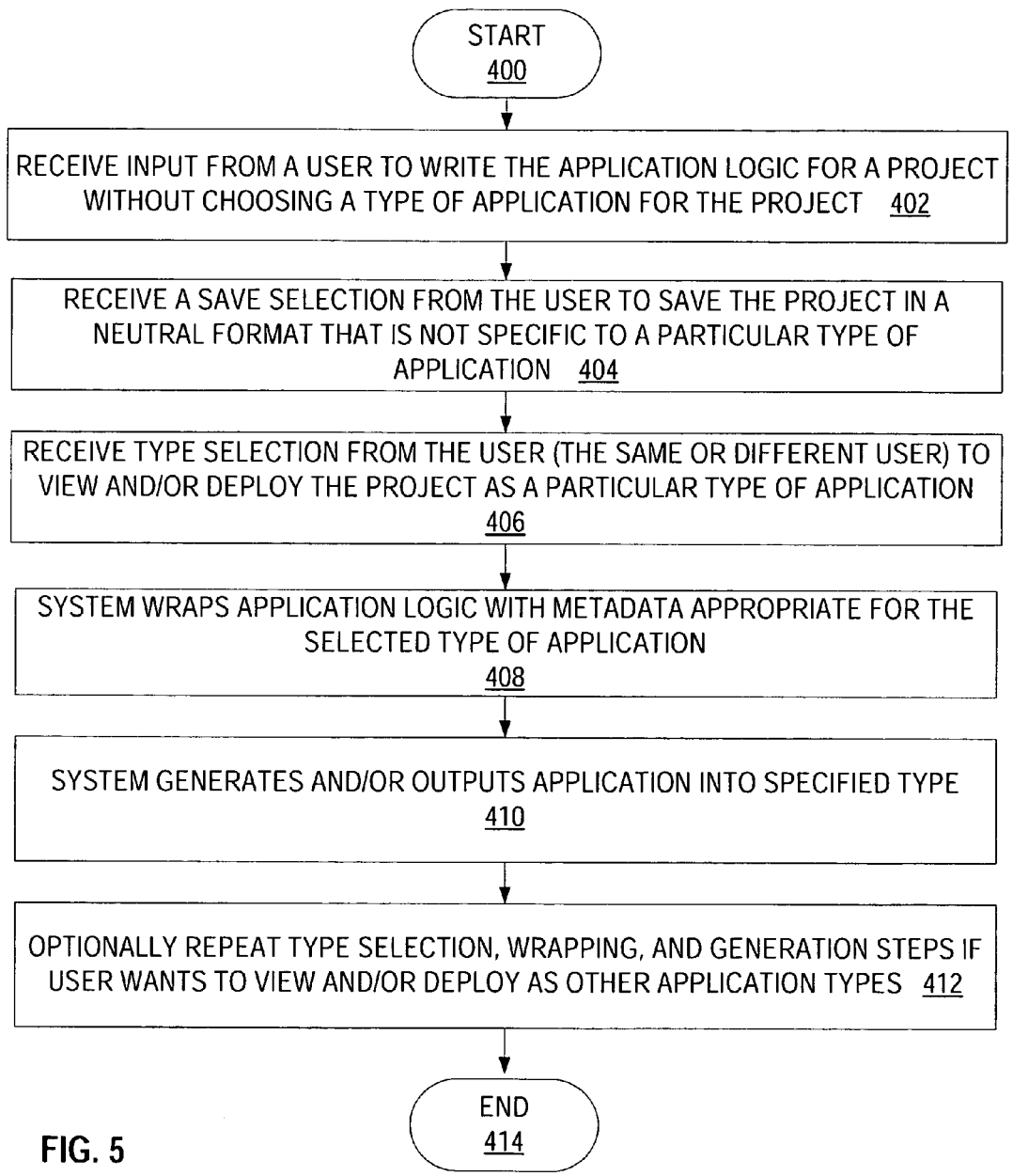
FIG. 5 is a process flow diagram for one implementation of the system of FIG. 1 illustrating the stages involved in saving the project in a neutral format and then targeting it to one or more project types at a later time.

FIG. 5 illustrates one implementation of the stages involved in saving the project in a neutral format and then targeting it to one or more project types at a later time. In one form, the process of FIG. 5 is at least partially implemented in the operating logic of computing device 700 (of FIG. 7). The procedure begins at start point 400 with receiving input from a user to write the application logic for a project without choosing a type of application for the project (stage 402). A save selection is received from the user to save the project in a neutral format that is not specific to a particular type of application (stage 404). The system receives a type selection from the user (e.g. the same or different user) to view and/or deploy the project as a particular type of application (stage 406). The system wraps the application logic with metadata that is appropriate for the selected type of application (stage 408). The system generates and/or outputs the application into the specified type (stage 410). The type selection, wrapping, and generation steps are optionally repeated if the user wants to view and/or deploy the project as other application types (stage 412). The process ends at end point 414.

Figure 6:
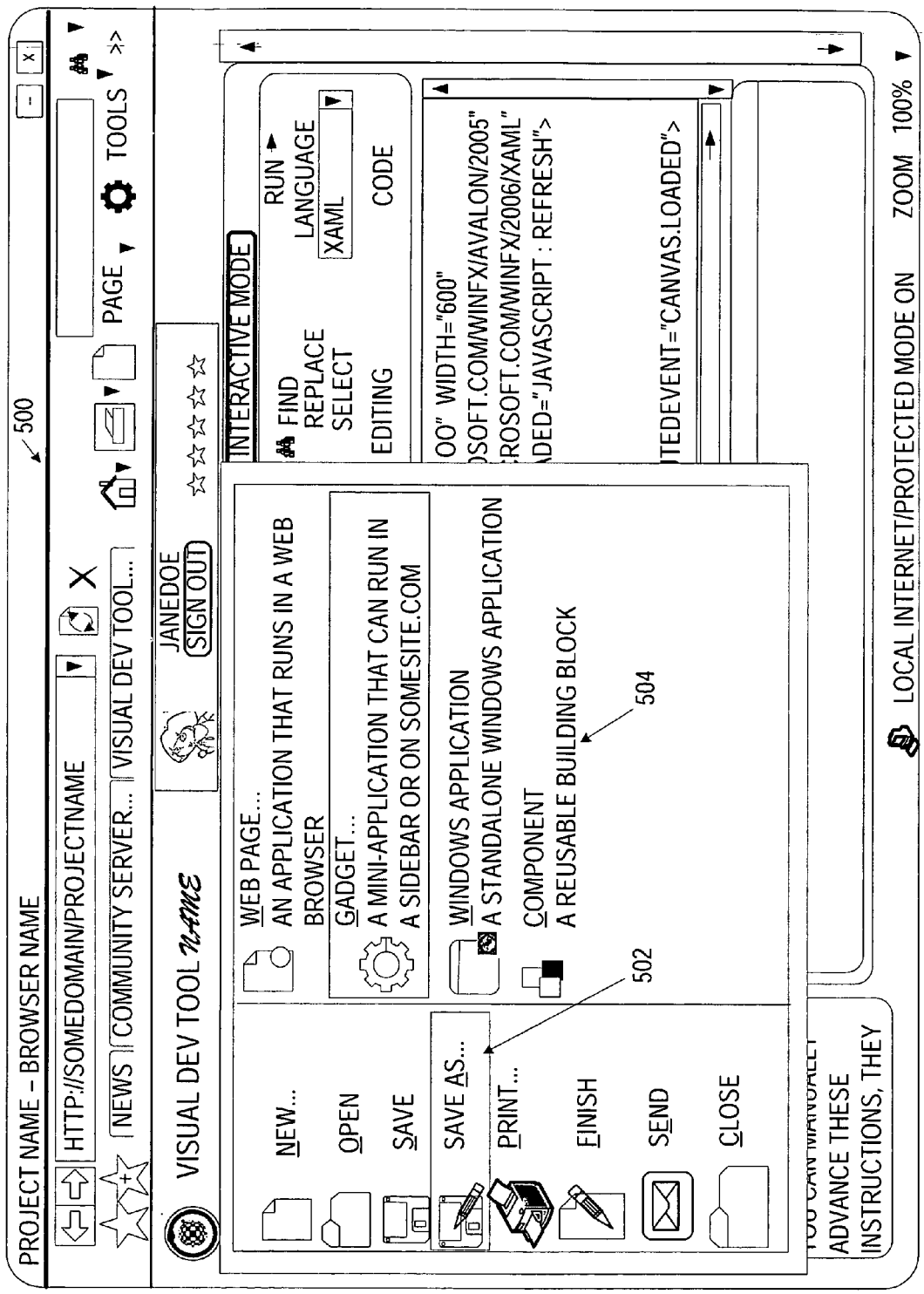
FIG. 6 is a simulated screen for one implementation of the system of FIG. 1 that illustrates saving a project as a particular type after writing some code.

FIG. 6 is a simulated screen 500 for one implementation of the system of FIG. 1 that illustrates saving a project as a particular type after writing some application logic. Upon selecting the Save As option 502, various options are then shown for the project type 504. The user can choose one of the project types 504 to select the type of project that the application logic should be turned into. Upon selecting a particular type from the list, the system then wraps the application logic written by the user with metadata that is appropriate for the selected type. In the case of a gadget as selected in the example of FIG. 6, the system could create some HTML code in an HTML file that provides the additional application logic and file name that would be needed for the application logic written by the user to then operate as a gadget. In one implementation, the user is able to focus on creating the fuictionality of the application logic first, and then deciding on the one or more resulting projects types later. In another implementation, the user can choose a type of project 504 up front, and then write the application logic. In such an implementation (as described in FIG. 4), the user can later retarget the application logic to yet another project type at a later point in time.

Figure 7:
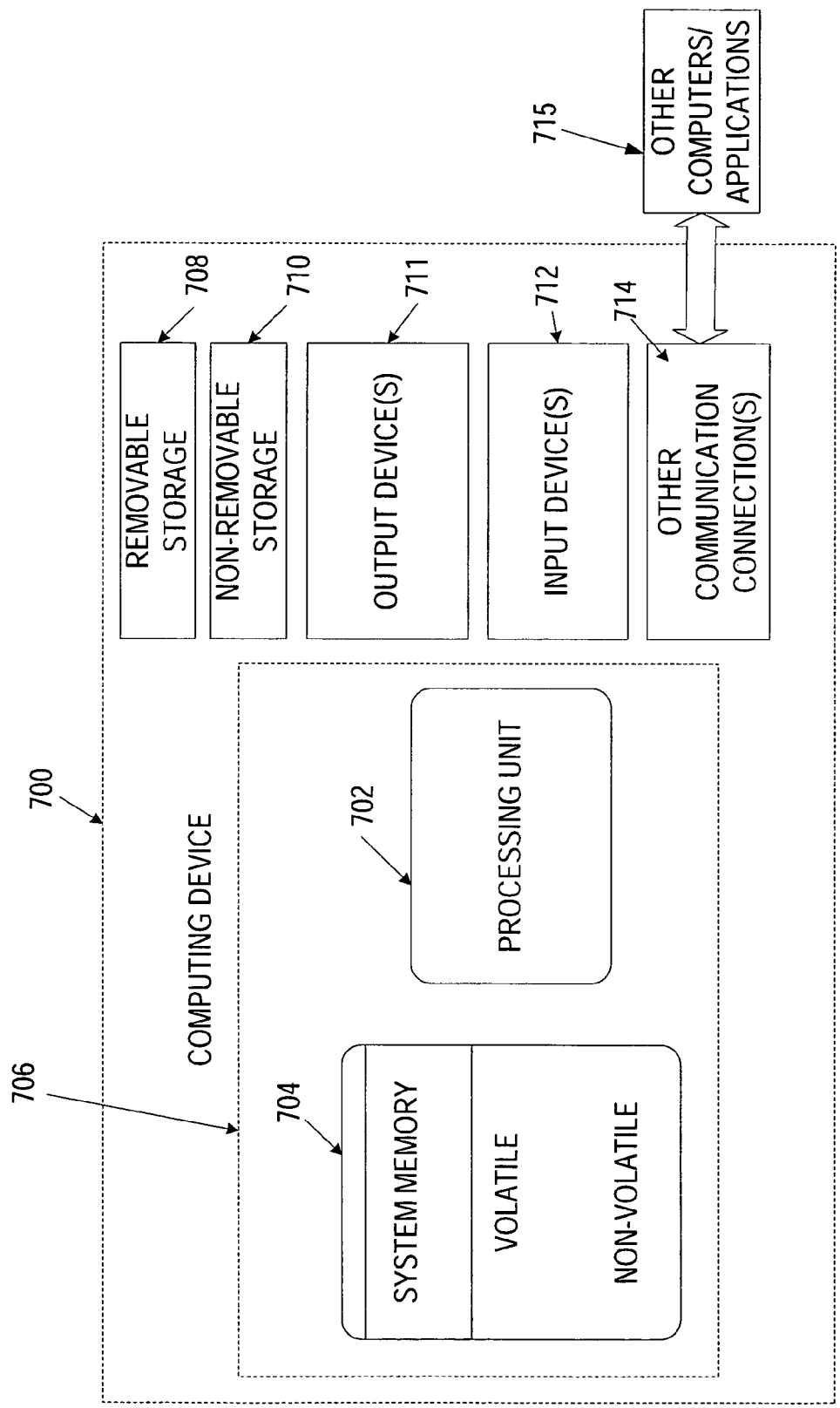
FIG. 7 is a diagrammatic view of a computer system of one implementation.

As shown in FIG. 7, an exemplary computer system to use for implementing one or more parts of the system includes a computing device, such as computing device 700. In its most basic configuration, computing device 700 typically includes at least one processing unit 702 and memory 704. Depending on the exact configuration and type of computing device, memory 704 may be volatile (such as RAM), non-volatile (such as ROM, flash memory, etc.) or some combination of the two. This most basic configuration is illustrated in FIG. 7 by dashed line 706.

Additionally, device 700 may also have additional features/functionality. For example, device 700 may also include additional storage (removable and/or non-removable) including, but not limited to, magnetic or optical disks or tape. Such additional storage is illustrated in FIG. 7 by removable storage 708 and non-removable storage 710. Computer storage media includes volatile and nonvolatile, removable and non-removable media implemented in any method or technology for storage of information such as computer readable instructions, data structures, program modules or other data. Memory 704, removable storage 708 and non-removable storage 710 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 700. Any such computer storage media may be part of device 700.

Computing device 700 includes one or more communication connections 714 that allow computing device 700 to communicate with other computers/applications 715. Device 700 may also have input device(s) 712 such as keyboard, mouse, pen, voice input device, touch input device, etc. Output device(s) 711 such as a display, speakers, printer, etc. may also be included. These devices are well known in the art and need not be discussed at length here. In one implementation, computing device 700 includes some or all parts of software development application 200.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A method for retargeting a software application comprising the steps of:
   providing a development environment, the development environment comprising a processing unit coupled to a memory;
   receiving input from a user to write application logic for a project using the development environment;
   receiving a selection from the user to save the project as a particular type;
   targeting the project by wrapping the application logic with metadata that is appropriate for the particular type of project to create at least one resulting file, the at least one resulting file comprising the appropriate metadata for the particular type and the application logic, the at least one resulting file created with an appropriate extension, wherein the application logic is configured to be retargeted to a second type at a later point in time;
   determining if the resulting file needs compiled;
   if the resulting file is determined to need compiled, then compiling the resulting file into a compiled application; and
   retargeting the application by wrapping the application logic with metadata that is appropriate for the second type to create at least one second resulting file, the second type is a different project type than the particular type.

2. The method of claim 1, wherein the development environment is implemented as a thin client.

3. The method of claim 1, wherein the particular type of the project is a web page.

4. The method of claim 1, wherein the particular type of the project is a widget.

5. The method of claim 1, wherein the particular type of the project is a Windows application.

6. The method of claim 1, wherein the particular type of the project is a component.

7. The method of claim 1, wherein the metadata includes at least one line of code that is specific to the particular type of project.

8. A computer-readable storage medium having computer-executable instructions for causing a computer to perform the steps recited in claim 1.

9. A computer-readable storage medium having computer-executable instructions for causing a computer to perform steps comprising:
   provide a development environment;
   receive input from a user to write application logic for a project using the development environment;
   save the project in a neutral format that is not specific to a particular type of project;
   receive a selection from the user to save the project as a particular type of project;
   targeting the project by wrapping the application logic with metadata that is appropriate for the particular type of project to create at least one resulting file, the at least one resulting file comprising the appropriate metadata for the particular type and the application logic, the at least one resulting file created with an appropriate extension, wherein the application logic is configured to be retargeted to a second type at a later point in time;
   determining if the resulting file needs compiled;
   if the resulting file is determined to need compiled, then compiling the resulting file into a compiled application; and
   retargeting the application by wrapping the application logic with metadata that is appropriate for the second type to create at least one second resulting file, the second type is a different project type than the particular type.

10. The computer-readable storage medium of claim 9, further having computer-executable instructions for causing a computer to perform the step comprising:
    compile the at least one resulting file if compilation is determined to be appropriate.

11. The computer-readable storage medium of claim 9, wherein the development environment is operable to be provided as a thin client.

12. The computer-readable storage medium of claim 9, wherein the development environment is operable to be provided as a thick client.

13. A method for retargeting a software application comprising the steps of:
    using a processing unit, receiving input from a user to write application logic for a project;
    receiving a selection from a user to generate the project as a first type;
    receiving a selection from the user to save the project as a particular type;
    wrapping the application logic with metadata appropriate for the first type and creating at least one resulting file appropriate for the first type, the at least one resulting file appropriate for the first type comprising the metadata appropriate for the first type and the application logic;

receiving a second selection from the user to generate the project as a second type; and receiving a selection from the user to save the project as a particular type;

retargeting the project of the first type by wrapping the application logic with metadata appropriate for the second type and creating at least one resulting file appropriate for the second type, the at least one resulting file appropriate for the second type comprising the metadata appropriate for the second type and the application logic, the at least one resulting file created with an appropriate extension;

determining if the resulting file needs compiled; and if the resulting file is determined to need compiled, then compiling the resulting file into a compiled application.

14. The method of claim 13, wherein the first type of project is a different type of project than the second type.

15. The method of claim 13, wherein the first type of the project is selected from the group consisting of a web page, a widget, a Windows application, and a component.

16. The method of claim 13, wherein the metadata appropriate for the first type includes at lease one line of code that is specific to the first type of project.

17. The method of claim 13, further comprising:

prior to receiving the selection to generate the project as the first type, saving the project in a neutral format that is not specific to a particular type of project.

18. A computer-readable storage medium having computer-executable instructions for causing a computer to perform the steps recited in claim 13.

* * * * *

UNITED STATES PATENT AND TRADEMARK OFFICE
CERTIFICATE OF CORRECTION

| | | |
|---|---|---|
| PATENT NO. | : 8,209,662 B2 | |
| APPLICATION NO. | : 11/633400 | |
| DATED | : June 26, 2012 | |
| INVENTOR(S) | : Nathan et al. | |

It is certified that error appears in the above-identified patent and that said Letters Patent is hereby corrected as shown below:

In column 8, line 5, in Claim 16, delete "lease" and insert -- least --, therefor.

Signed and Sealed this
First Day of January, 2013

David J. Kappos
*Director of the United States Patent and Trademark Office*